(12) United States Patent
Purushothaman

(10) Patent No.: US 11,921,739 B1
(45) Date of Patent: Mar. 5, 2024

(54) SYSTEM, DEVICE AND METHOD FOR GENERATING A COMMON DATA FRAMEWORK

(71) Applicant: FEDERAL HOME LOAN MORTGAGE CORPORATION, McLean, VA (US)

(72) Inventor: Lakshmi Purushothaman, McLean, VA (US)

(73) Assignee: FEDERAL HOME LOAN MORTGAGE CORPORATION, McLean, VA (US)

( * ) Notice: Subject to any disclaimer, the term of this patent is extended or adjusted under 35 U.S.C. 154(b) by 415 days.

(21) Appl. No.: 15/836,145

(22) Filed: Dec. 8, 2017

(51) Int. Cl.
*G06F 16/25* (2019.01)
*G06F 16/21* (2019.01)
*G06F 16/2458* (2019.01)
*G06F 17/15* (2006.01)
*G06F 17/18* (2006.01)

(52) U.S. Cl.
CPC .......... *G06F 16/258* (2019.01); *G06F 16/212* (2019.01); *G06F 16/2465* (2019.01); *G06F 17/15* (2013.01); *G06F 17/18* (2013.01)

(58) Field of Classification Search
CPC .... G06F 16/258; G06F 40/157; G06F 40/242; G06F 17/18; G06F 16/211; G06F 16/212; G06F 16/2465; G06F 17/15; G06F 16/116; G06F 16/313; G06N 3/08
See application file for complete search history.

(56) References Cited

U.S. PATENT DOCUMENTS

| | | | |
|---|---|---|---|
| 8,086,618 B2* | 12/2011 | Lim | G06F 16/258 707/756 |
| 2017/0060931 A1* | 3/2017 | Puri | G06Q 10/063 |
| 2019/0317835 A1* | 10/2019 | French | G06F 16/288 |
| 2019/0333638 A1* | 10/2019 | Elidan | G16H 20/40 |

* cited by examiner

*Primary Examiner* — Marcin R Filipczyk
(74) *Attorney, Agent, or Firm* — MH2 TECHNOLOGY LAW GROUP, LLP

(57) ABSTRACT

In an exemplary implementation, systems, devices and methods for generating a common data engineering framework include receiving source data having one or more formats from an external source, analyzing the source data, generating a data dictionary having a mapping of data elements of the source data based on the analysis of the source data, generating and storing in memory a configuration file having the data dictionary, and generating and storing in the configuration file a data model logically organizing the data from the data dictionary in a common format.

20 Claims, 15 Drawing Sheets

| ELEMENT | TABLENAME | Element TYPE | OCCURRENCES | DATA TYPE |
|---|---|---|---|---|
| NoteAmount | lpa_aa_loan_flat | BOOLEAN | 48042 | FMAmount |

| BASIC PROFILE | StrSPECIFIC | NumSPECIFIC | DISTRIBUTION | CORRELATION | VALID VALUES |
|---|---|---|---|---|---|
| 1 | | 1 | 1 | | |

| SYSTEM | TABLE | ProfilingStartDate | ProfilingEndDate | Comment |
|---|---|---|---|---|
| LPA_AA | lpa_aa_loan_flat | 8/24/2017 | 9/8/2017 | This report provides statistics on selected numeric fields, including customized percentiles, e.g. p0025 indicates 0.025 (2.5%) percentile. |

| EDSName | Enterprise Name | COUNT | MEAN | MIN | MAX |
|---|---|---|---|---|---|
| NoteAmount | amt_note | 11709485 | 229724 | 1 | 2655900 |

| p0025 | p005 | p025 | p05 | p75 | p095 |
|---|---|---|---|---|---|
| 55959.6 | 69689.84 | 134816.6 | 204208.1 | 378934.4 | 541947.4 |

*Fig. 4B*

| PATH | ELEMENT | ELEMENT TYPE | TABLENAME | PRIMARYKEY |
|---|---|---|---|---|
| EnterpriseDecisionService.LoanOrigination | NoteAmount | BOOLEAN | lpa_aa_loan_flat | ? |

| EnterpriseNote | EnterpriseID Rule | Transformation | FilterID | FilterCriteria | FilterOpts |
|---|---|---|---|---|---|
| Max, Min Values based on Loan Type | 1 | amt_note | 1 | > $500K | Not Null |

*Fig. 6*

SYSTEM, DEVICE AND METHOD FOR GENERATING A COMMON DATA FRAMEWORK

BACKGROUND

Digital data is pervasive in today's society as more and more data is stored online. This data comes in various formats and is continuously evolving with the introduction of new frameworks and systems. It has become increasingly important to be able to efficiently analyze and organize this data for a variety of technical processes and data analytics. Data wrangling, or data munging, is one process of manually transforming and mapping this data from one raw data form into another format with the intent of making it more appropriate and valuable for a variety of downstream purposes.

SUMMARY

In an exemplary implementation, systems, devices and methods for generating a common data engineering framework include receiving source data having one or more formats from an external source, analyzing the source data, generating a data dictionary having a mapping of data elements of the source data based on the analysis of the source data, generating and storing in memory a configuration file having the data dictionary, and generating and storing in the configuration file a data model logically organizing the data from the data dictionary in a common format.

BRIEF DESCRIPTION OF THE FIGURES

FIG. 4A is an exemplary data structure for profiling of data;

FIG. 4B is an exemplary data structure arising out of data profiling;

FIG. 6 is an exemplary data structure of the configuration data;

Like reference symbols in various drawing indicate like elements.

DETAILED DESCRIPTION

Figure 1:
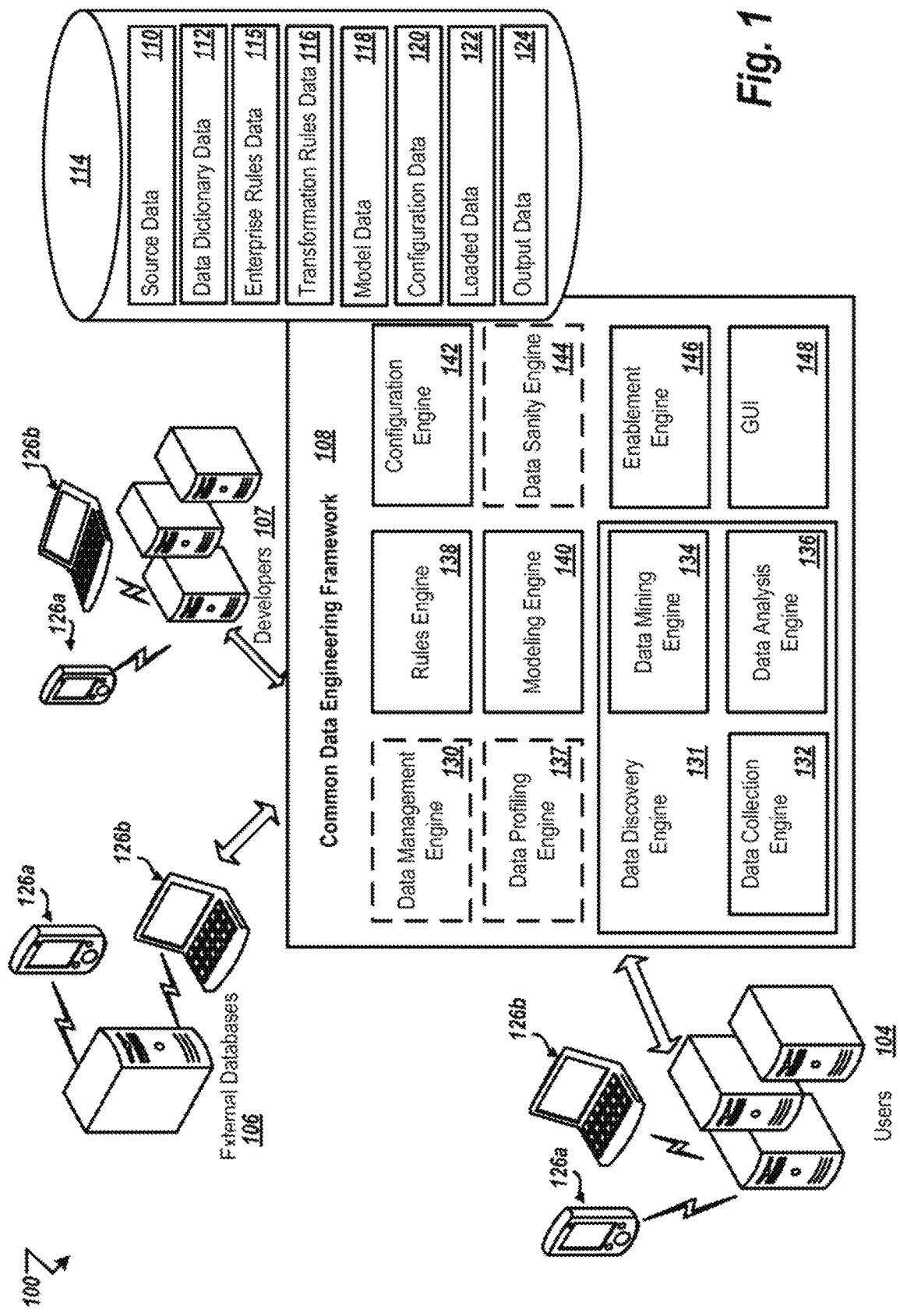
FIG. 1 is an exemplary diagram of an environment of a common data framework (CDF) system.

FIG. 1 is a diagram of an example environment 100 for a common data framework system 108. The diagram illustrates a series of interactions between one or more participants, such as users 104 and developers 107, and devices in the CDF system 108 which is configured to analyze and reformat incoming data into a variety of formats via data munging and to provide data analytic reporting. Traditionally, the data munging process requires a plurality of experts to properly handle the incoming data. For example, data discovery, including analysis and profiling of incoming data, is performed by a data analyst who gathers insights and documents any enterprise and transformation rules into a requirements document. This is done manually using Structured Query Language (SQL)/Statistical Analysis System (SAS) and other analytics software in conjunction with manual data analyst input. Next, enterprise rules and/or transformation rules are provided to Information Technology (IT) technical teams to convert the rules into technical requirements. A data model is then separately designed to map source data to target data and data sanity is performed based on hard coded programming specific to the data model. Finally, additional code is written in a different language from previously coded portions of the process to transform the data and load it into a target database. Accordingly, a business has one deliverable in one format such as enterprise rules, developers deliver code to implement data discovery, and a data modeler delivers the data model. These are all separately implemented deliverables from various third parties that need to be connected together to provide data munging and data analytics.

This approach to data munging presents a variety of issues such as having different parties involved at different stages of the process. Accordingly, the approach creates the increased chance of errors being introduced into the process, especially when connecting the deliverables. Also, all of the code developed for this process is tightly coupled with specific logic regarding the type of data and enterprise rules particular to the user 104 and therefore none of the code can be reused. It is well documented that data scientists and business users spend 50% to 80% of their time with data munging. Therefore, the process of performing data discovery is incredibly onerous as it can take months to process large sets of data while still while still having errors throughout the process. Further, it becomes very difficult to effectively provide different data munging processes when a user 104 needs to use source data 110 from a variety of different sources that are all in different formats as this requires the repetition of the entire process described above.

The Common Data Framework (CDF) system 108 provides a technically implemented solution to the above-noted technical problems existing in the conventional data munging process while also providing additional improvements to various technical areas such as data management, data retention, data profiling, and data analytics. Users 104, such as businesses, may interact with the CDF system 108 to provide their data for data munging by the CDF system 108. The CDF system 108 provides a technical implementation of a new and improved data munging process by creating a modular implementation of the data munging process that can be used with a variety of users having large volumes of different sets of data. Accordingly, as described further herein, the CDF system 108 can receive user 104 data from the user 104 and/or external databases 106, perform data discovery, generate a model, apply rules and load the data to allow for the generating of data analytics reports. This process can be entirely automated and is contained within one system therefore allowing specifically created configurations to be generated for each user 104. This includes, but is not limited to, the generation of specifically coded configuration files generated by the system as well as the generation of recommended rules and profiling paradigms. Thus, a single system can implement a data munging process for a variety of users 104 that is more efficient, requires less memory and processing, and is devoid of errors normally found in conventional data munging processes. As such, it was documented that use of the CDF system 108 reduced the data munging process by at least 75% therefore allowing the industry to shift its focus from data preparation to reporting and analysis. Accordingly, it is now possible to provide daily access to standardized organized data thereby greatly improving the day to day operations and decision-making of any user 104.

The CDF system 108 includes one or more engines or modules that perform processes associated with receiving data, analyzing and reformatting the data and providing data analytics of the data. References to the engines or modules throughout the disclosure are meant to refer to software processes executed by circuitry of one or more processing circuits, which can also be referred to interchangeably as processing circuitry. In some implementations, the processes associated with the CDF system 108 can be performed by one or more servers having one or more processing circuits such that some steps may be performed on different servers. In one example, the CDF system 108 includes a data management engine 130 that organizes the data received by the CDF system 108 from the users 104 and external databases 106 and also controls data handling during execution of the processes described further herein. In some implementations, the data management engine 130 processes data gathered by a data collection engine 132 from the external databases 106 and loads the gathered data to data repository 114 as source data 110. The source data 110 can be a variety of different data based on the source from which it was received, such as data from businesses, and can include data in various formats such as Extensible Markup Language (XML). Java Script Object Notation (JSON), Portable Document Format (PDF), Optical Character Recognition (OCR), Tagged Image File (TIF), word documents and other formats as would be understood by one of ordinary skill in the art. In one example, the data could represent as real estate information including, but not limited to, appraisal information, mortgage information, geographic information, and other types of information associated with the loan origination process.

The data management engine 130 also receives and processes inputs from users 104 of the system. For example, the users 104 may determine when to provide access to their external databases 106 or can provide operating instructions for the CDF 108 to particularly analyze the data or provide data analytics reports as further described herein. The users 104 can connect to the CDF system 108 via Application Programming Interfaces (APIs), graphical user interfaces (GUIs) and/or other interfaces as would be understood by one of ordinary skill in the art. The users 104 may have database information stored internally within their business or externally via external databases 106. The external databases 106 may also be independent of the users 104 and may be directed to third-party data or other data stored on various networks such as the Internet.

The data discovery engine 131 is responsible for analyzing the incoming source data 110 and parsing the source data 110 into a variety of fields to organize and identify elements within the source data 110. The data discovery engine 131 includes a plurality of different engines responsible for handling the data discovery process. This includes the data collection engine 132, the data analysis engine 136 and the data mining engine 134. The data management engine 130, the data profiling engine 137 and the data sanity engine 144 are also involved in the data discovery process of the data discovery engine 131 and are therefore represented as having dotted lines in FIG. 1.

As part of the data discovery process, the data collection engine 132 collects all of the source data 110 that should be processed as part of the data discovery process. This can involve collected data from a variety of users 104 and/or external databases 106 of one or more users 104. This data is then stored in the data repository 114 as the source data 110.

The data analysis engine 136 analyzes the source data 110 to determine what type of information is included in the source data 110. As such, the data analysis engine 136 will identify various items and meta data such as data elements, their values, their formats, their types and their corresponding paths from the source data 110. The data profiling engine 137 can apply various profiling algorithms to the analyzed data to identify various relationships between the data or occurrence and other statistical data regarding the elements of the analyzed source data 110. These algorithms can be determined by the user or can be automatically generated by the system based on processing of the analyzed source data 110 as further described herein. For example, data profiling algorithms can include basic profiling, distributions (i.e. min, max), valid values, data variety, data veracity, data qualification and correlation.

The data sanity engine 144 reviews all of the analyzed data analyzed by the data analysis engine 136 and removes any outliers from the data. For example, if the source data 110 corresponds to appraisal reports for various real estate items, the data should include an appraisal value. However, if this value does not exist within the source data 110 then the data sanity engine 144 determines that there is an issue with a particular record. The data sanity engine can then expunge the record from data load process 122 with standardized dataset. The data sanity engine 144 can also remove any trial data that was created by users 104 before having the CDF system 108 generate any final reports.

The data mining engine 134 mines all of the source data 110 as analyzed by the data analysis engine 136 and verified through the data sanity engine 144 to identify possible sample values, the type of data, patterns such as relationships across the elements and correlation between values of the data which will be used by the modeling engine 140 to model the data into model data 118. For example, information contained in the source data 110 includes values that may not initially be available to the CDF system 108 such as business element names, their data types and their actual values which are particular to the specific data of the user 104. Accordingly, the data mining engine 134 uses data mining algorithms to determine these characteristics. This allows the data to be logically organized within particular data structures. Data verified by the data sanity engine 144 and updated based on the data mining is then stored in the data repository 114 as the data dictionary 112.

The modeling engine 140 then analyzes the data included in the data dictionary 112 to identify how to logically organize all of the data. For example, the modeling engine 140 may organize the data by assigning data to tables based on correlations and relationships between the data as determined by the data profiling engine 137 and the data discovery engine 131. For example, the modeling engine 140 may identify data that is part of a bank account and will therefore generate a table having data from a variety of fields such as account owners, types of transactions (i.e. debit, credit) and types of accounts (i.e. checking, savings, money market). Therefore, the modeling engine 140 can automatically determine the various types of data included in the originally received source data 110 and based on information determined by the data discovery engine 131, the data modeling engine 140 can structure the data in memory along with related data. The modeling engine 140 provides structure to organize the data into a common format by particular naming conventions which will allow a rules engine 138 to know where to look for the data and how to identify the data to be able to apply particular rules. The logically organized data in a common format generated by the modeling engine 140 is stored in the data repository 114 as model data 118.

The rules engine 138 provides for the generation and application of various enterprise rules and/or transformation rules. Enterprise rules can constitute rules particular to the user 104 using the CDF system 108 and are stored as enterprise rules data 115. For example, if the user 104 is a business, the enterprise rules will represent rules specific to that business for which the source data 110 and any output dataset 124 should conform. For example, in a loan application, the business may always want to have applicant data in a format having the first name and last name of the borrower be concatenated into a full name. Further, a business may have a particular naming convention for particular data elements and therefore the enterprise rules may provide a data identifier for identifying a particular type of data in the source date. For example, identifying a naming convention of renaming to "Home Equity Combined LTV (Loan-to-Value)" when LoanScopeType=HomeEquityCombined and LTVSourceType=FreddieMacCalculated; renaming to "Combined LTV" when LoanScopeType=Combined and LTVSourceType=FreddieMacCalculated; renaming to "Origination LTV" when LoanEventType=Origination and LTVSourceType=FreddieMacCalculated.

This enterprise rule can be provided by the user 104 via the GUI 148 or other method when using the CDF system 108 to analyze their source data 110. Enterprise rules can also be automatically generated by the rules engine 138 based on common business rules within the particular industry. Accordingly, the CDF system 108 may store within enterprise rules data 115 various rules corresponding to different industries. The CDF system 108 can then receive a designation of the user industry from the user 104 to identify particular enterprise rules data 115 to apply or can automatically determine the type of industry based on an analysis of the source data 110 and various naming conventions, data types, and data relationships included within the source data 110. The analysis of the source data 110 to automatically generate enterprise rules data can be performed by the data profiling engine 137 via one or more algorithms. Therefore, based on a determination of a particular industry, the CDF system 108 will generate particular enterprise rules data 115 corresponding to the user 104. Based on this analysis, the rules engine 138 can refer to predetermined enterprise rule sets included in the enterprise rules data 115 stored in the repository 114 to determine which rules to apply to the model data 118.

The rules engine 138 also generates transformation rules as transformation rules data 116 and applies the transformation rules to data. As with the enterprise rules, the transformation rules can be input by the user via the GUI 148 or other method or can be automatically generated by the CDF system 108. Transformation rules include a variety of technical rules to be applied to the data to transform the data. For example, a transformation rule may involve the removal of any special characters in a text field to make it easier to read by the CDF system 108. Another example is conversion of a character field source data 110 to an integer so that the CDF system 108 can perform calculations on the data. These rules may also be automatically generated by the rules engine 138 based on analysis of the source data including the type of data, values and attributes. For example, renaming to "Combined LTV" when LoanScopeType=Combined and LTVSourceType=FreddieMacCalculated; renaming to "Origination LTV" when LoanEventType=Origination and LTVSourceType=FreddieMacCalculated.

Based on this analysis, the rules engine 138 can refer to predetermined transformation rule sets included in the transformation rules data 116 stored in the repository 114 to determine which rules to apply to the model data 118.

The configuration engine 142 generates a configuration file having a variety of information determined from different modules of the CDF system 108 and stores this information in the data repository 114 as configuration data 120. For example, in one embodiment, the configuration engine 142 incorporates the data dictionary data 112 output from the data discovery engine 131, the model data 118 output from the modeling engine 140 and the enterprise rules data 115 and transformation rules data 116 output from the rules engine 138 into a single file having the configuration data 120 (E.g. the renaming provided above). Therefore, the CDF system 108 can generate a plurality of configuration files each of which is particular to a specific user 104. The configuration data 120 of a particular user 104 can then be used whenever the user 104 wants to input additional data to the CDF system 108 or wants to generate data analytics using particular profiling algorithms while taking into account their enterprise and transformation rules. This can be done without requiring any updates or recording to the CDF system 108.

The modeling engine 140 is responsible for performing dynamic data definition language (DDL) generation based on the configuration data 120 to create tables for a target database such as the data repository 114. Data from the configuration data 120 is then loaded into the target tables as loaded data 124. At this point, the CDF system 108 has analyzed the incoming source data 100, formatted it into a configuration data 120 and output loaded data 123 into tables which can be used by various profiling algorithms to generate data analytics as output data 124.

The users 104, external databases 106, and data repository 114 can connect to the CDF system 108 through computing devices 126 (e.g., mobile device 126a, computer 126b, or any other type of computing device) via a wired or wireless network (not shown). Thus, the data repository 114 may be all one database or distributed databases as would be understood by one of ordinary skill in the art. The network can include one or more networks, such as the Internet and can also communicate via wireless networks such as WI-FI, BLUETOOTH, cellular networks including EDGE, 3G and 4G wireless cellular systems, or any other wireless form of communication that is known.

Figure 2:
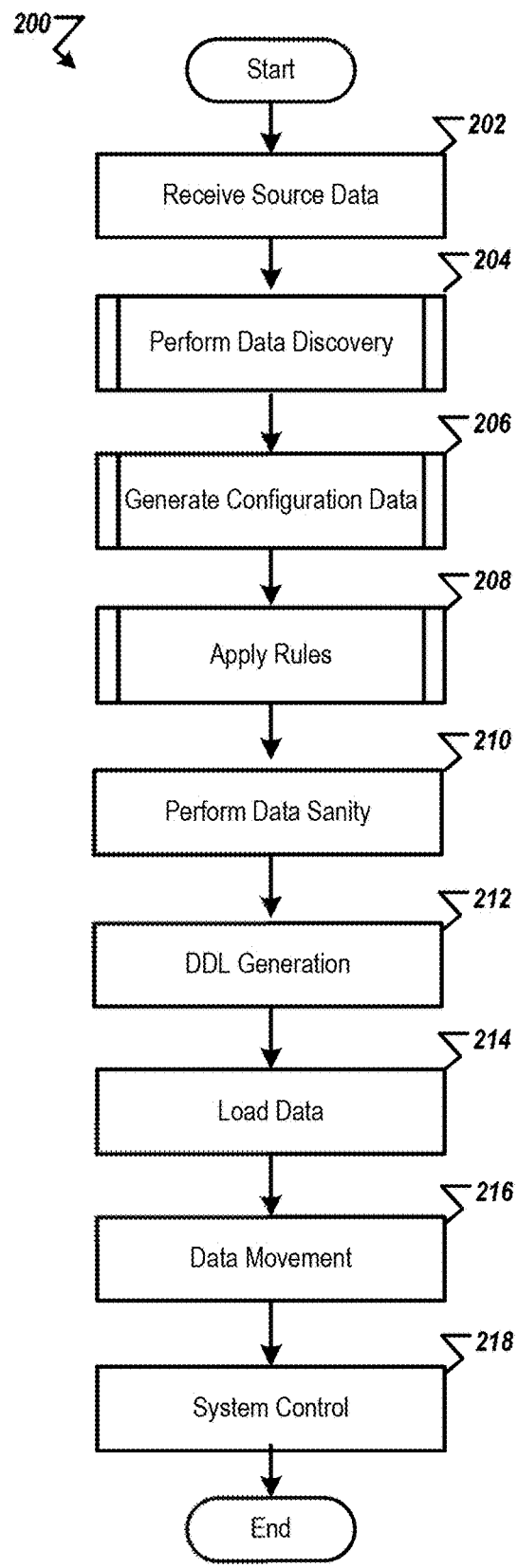
FIG. 2 is an exemplary flowchart of a process implemented by the CDF system.

FIG. 2 is an exemplary flowchart of a process 200 implemented by the CDF system 108 for performing data munging and outputting data analytics. One or more of the steps of the process 200 can be performed in series, parallel, or in any other order than the order of steps described herein. The process 200 is performed by one or more of the processing engines of the CDF system 108. For example, processing circuitry of the CDF system 108 may implement instructions particular to the various processing engines that are included in memory of the CDF system 108.

At step 202, the CDF system 202 receives or obtains source data 110 from at least one of the users 104 and external databases 106. The source data may be received or obtained via an API of the CDF system 108. For example, one or more users 104 may send internal source data 110 and/or data from one or more external databases 106 or the CDF system 108 may retrieve the source data 110 from the users 104 and/or external databases 106. The source data 110 can be in any format such as XML, JSON, TXT, CSV and word documents and represents data from which the user 104 would like to obtain analytical information about. Thus, internal data of the user 104 and external data in one or more external databases 106 can include semi-structured data, such as XML and/or JSON, stored in a Hadoop Distributed File System (HDFS). For example, a user 104 may want daily access to standardized, organized data to assess the impact of a new offering in a loan origination process and to support risk monitoring, quality control sampling and fraud analytics.

At step 204, the CDF system 108 performs data discovery to analyze the source data 110 received in step 202. This process is illustrated in further detail in FIG. 3 as process 300 implemented by the data discovery engine 131. At step 302, the data collection engine 132 collects the source data 110 and the data analysis engine 136 analyzes the source data 110 to identify data elements or attributes within the data. The data elements include types of data included in the source data 110. For example, in the loan origination process, data may include a variety of types such as "LoanIdentifierType," "AlternateLoanIdentifier," "MortgageModificationIndicator," LoanIdentifier," TransactionIdentifier" and "NoteAmount." To identify this information, the data analysis engine 136 parses the data included in a variety of paths throughout the source data 110 thereby identifying various elements at step 302 as well as their associated paths at step 306. This will become important as further described herein when modeling the data and applying rules to the data so that the source of the data can be located to make the appropriate changes when reformatting the source data 110 in the CDF system 108. The data analysis engine 136 also determines meta-data from the source data 110 such as the format of the elements (i.e. string, Boolean, integer) and data types of the source data 110. Data types can be designations regarding which type one or more elements should be assigned to within the meta-data. For example, the elements "NoteAmount" and "BorrowerPropertyPurchasePriceAmount" can be correlated to the data type "FMAmount."

The data analysis engine 136 also causes the data profiling engine 137 to profile the source data 110 at step 308. In this process, a variety of profiling algorithms can be implemented to identify a variety of information about the source data 110. For example, a profiling algorithm can be run against the source data to identify the number of occurrences, standard deviations for types, average values and amounts of types of data of the elements identified in step 302. Based on this data and meta-data analysis, the data analysis engine 136 can identify various relationships between the data as well as fully understand a particular element of data. Additional profiling algorithms are string specific to identify a list of distinct values, and corresponding occurrence and frequencies for selected string fields. Further, number specific profiling algorithms can be applied that provide statistics on selected numeric fields, including customized percentiles. For example, once the data analysis engine 136 understands the data, the data profiling engine 137 may recognize that values for specific elements, such as housing costs, should be limited to particular values or mix or max values with respect to a jumbo loan and can use this to determine outliers during data sanity at step 310. Additionally, basic profiling can be performed by the data profiling engine 137 to provide basic statistics of selected fields such as counts, nulls, and Boolean value counts. A distribution profiling algorithm (i.e. Kolmogorov-Smirnov test) can be implemented for selected numeric fields.

FIG. 4A is an exemplary data structure 400 for the profiling of data. Here, the data structure 400 includes a variety of information about various elements (only one shown in FIG. 4A for explanation purposes) and the types of profiling that could be performed on these elements. For example, for the element NoteAmount, the data structure 400 indicates the element type as a Double and indicates a table name in which the information will be provided. The data structure 400 also indicates the data type as FMAmount as previously discussed. Finally, the data structure 400 provides a listing of profiling algorithms that can be run for this particular element such as the basic profiling algorithm, number specific algorithm and distribution algorithm. The data arising out of the profiling will be used by the data analysis engine 136 to identify occurrence information of the data element and relationship information between the data element and other data elements.

FIG. 4B provides an exemplary data structure 402 having information determined based on an exemplary implementation of the number specific profiling algorithm by the data profiling engine 137. The data structure 402 includes a variety of information relating to the data element NoteAmount such as the particular system in and table in which the data of NoteAmount is provided. The data structure 402 also includes a start and end date of the profiling as well as descriptive information about the particular output of the number profiling. Thus, the data structure 402 also includes the element name, an enterprise (i.e. business specific name) of the element, count, mean, min and max values arising out of the profiling as well as percentiles on selected numeric fields relating to the element.

Figure 3:
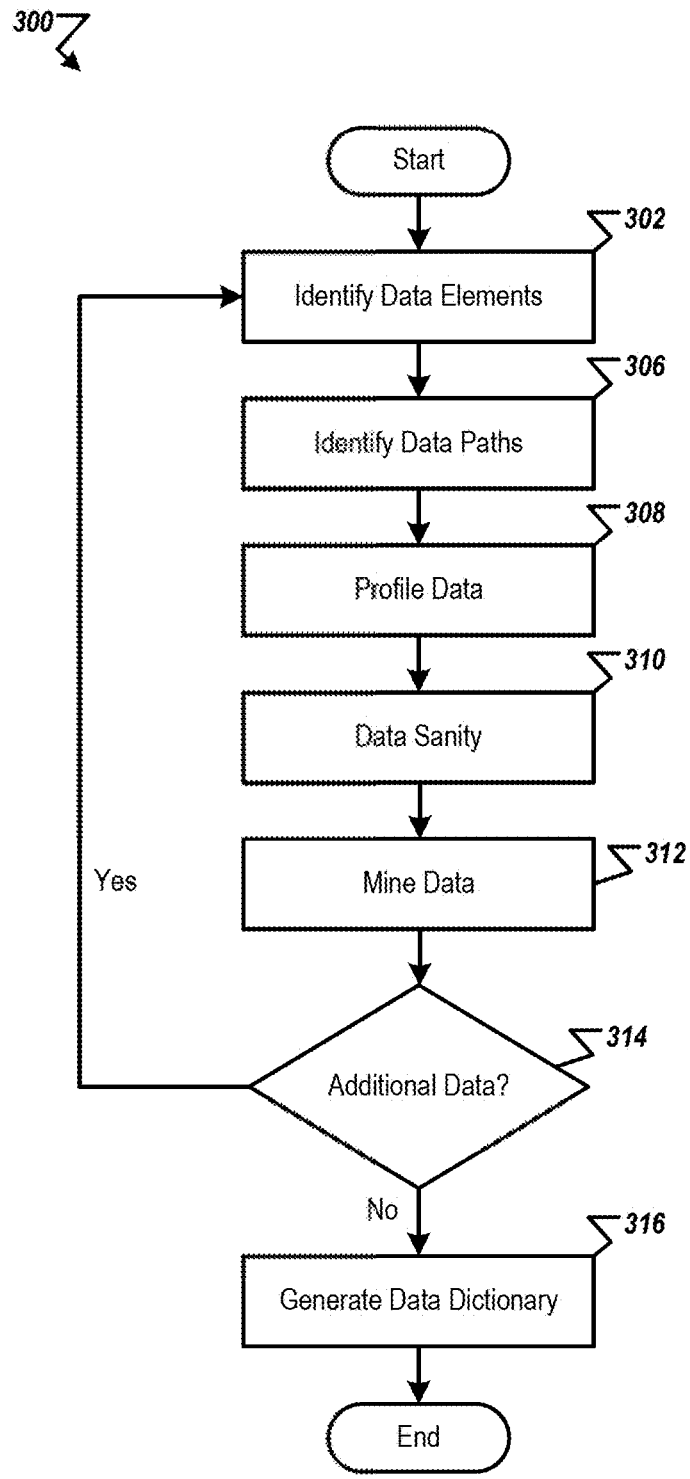
FIG. 3 is an exemplary flowchart of a data discovery process.

Referring to FIG. 3, once data profiling has been performed at step 308, the process 300 proceeds to step 310 to perform data sanity. Here, the data discovery engine 131 causes the data sanity engine 144 to review the analyzed data and process data based on profiled dataset 308. As such, the data sanity engine 144 may review the records to identify if any necessary values are missing with respect to particular elements. For example, for appraisal evaluation data, there should always be an expected appraisal value and therefore if the data sanity engine 144 notices that this data is not included in the information then the record of this data element needs to be analyzed until the CDF system 108 can identify corrective actions with respect to the outlier data element. Accordingly, the data sanity engine 144 determines whether it is possible and reasonable to continue the data discovery process. The data sanity engine 144 may exercise the smallest subset of application functions needed to determine whether the systems are accessible and the application logic is responsive. If the sanity test fails, it is not reasonable to attempt more rigorous testing on particular data. The CDF system 108 therefore avoids wasting time by quickly determining which data should be used to proceed with the data munging process, thereby enhancing the overall quality of the data munging and any downstream analytical reports. This also reduces processing time required to analyze the data thereby improving computer functionality while also reducing memory requirements as data which does not pass the data sanity process can be expunged.

Once data sanity has been performed, the process 300 proceeds to step 312 to have the data mining engine 134 mine the analyzed data. However, it should be noted that step 312 could be performed in parallel with the profiling or other steps of the process 300. The data mining engine 134 analyzes a large volume of historical data to identify patterns within the data such as relationships across elements. For example, multiple borrowers may be involved with a credit bureau with respect to a housing transaction but one may be self-employed. Therefore, this relationship must be noted by the data mining engine 134 to identify this information as it could affect the lending process. Therefore, the mining process is important to identify correlations between the analyzed data as this will be required for modeling of the data. Thus, the data mining engine 134 provides attribute correlations in part by analyzing historical data. In one example, the data mining engine 134 identifies key unique identifiers and then methodically cycles through each attribute to identify the relationships using machine learning algorithms. The data modeling engine 134 then provides the outputs with outlier information. Then the data modeling engine 134 shows the potential correlation between the attributes.

Based on completion of the data mining at step 312, it should be noted that there is a correlation between the data profiling and the data mining. For example, the CDF system 108 is flexible with respect to the profiling of data and therefore allows the user 104 to identify particular profiling algorithms to run against their data. However, the data analysis engine 136 can also determine other profiling algorithms that should be run against the data based on a review of the analyzed and mined data. This is determined by the data profiling engine 137 by using machine learning algorithms to train a model to continuously learn and apply the data profiling algorithms based on the source data types.

Once the data mining is completed, the process 300 proceeds to step 314 in which the data discovery engine 131 determines whether there is any additional information to process. If YES, the process proceeds back to step 302. Accordingly, the data discovery engine 131 will always be checking for additional or new enterprise attribute information available to the CDF system 108 so that the data can be continuously updated within the system to provide additional data munging, better data mining and enhanced data analytics reports. This auto evaluation of source data by the discovery engine 131 would not be possible in the conventional process as additional source data 110 from different users 104 and/or external databases 106 in different formats would require entirely new software to be written to handle data discovery particular to that source data 110. This would result in increased costs, less system efficiency and the likelihood that more errors will be introduced when analyzing the additional source data 110. If there is no additional data to be processed at 314, the process 300 proceeds to generating data dictionary data 112 at step 316.

Figure 4C:
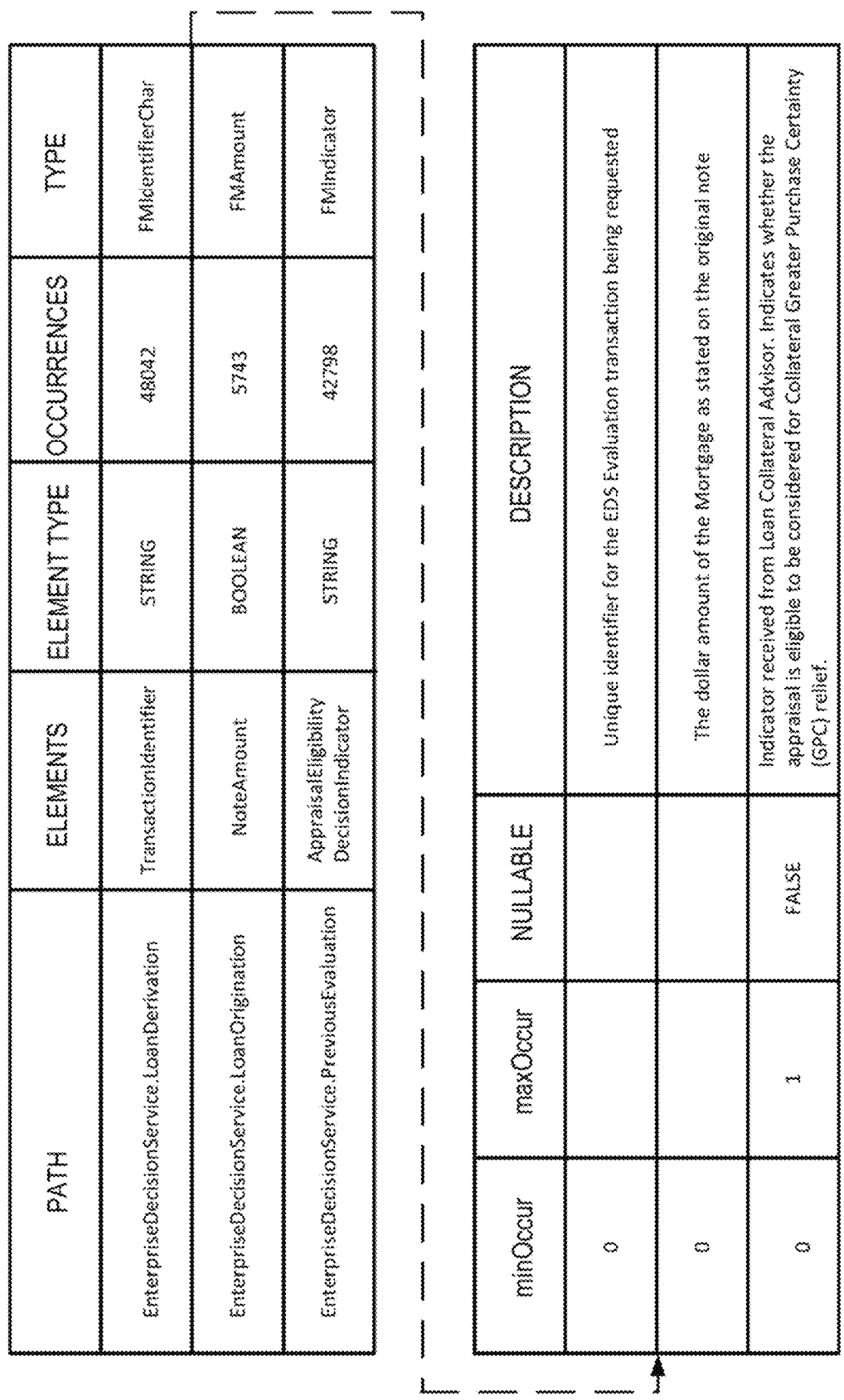
FIG. 4C is an exemplary data structure arising out of the data discovery process.

The data dictionary data 112, or data dictionary 112, can include some or all of the data determined by the data discovery engine 131 during the data discovery process. Accordingly, the data dictionary 112 includes information regarding data elements, data paths, profiling information, data formats, data types, data patterns and data relationships and correlations between the data. FIG. 4C illustrates an exemplary data structure 404 of the data dictionary 112. As illustrated, the data dictionary 112 includes information regarding the data elements, paths of the data elements, element types, occurrence information based on previously run profiling algorithms, a data type and min and max occurrence values, nullable information and description data regarding the element. The data dictionary is input to data modeling engine 140 with source data 100 and user data 104. The data modeling engine 140 then stores target data on occurrences and relationships in data repository 114.

Once the data dictionary 112 is generated by the data discovery engine 131 at step 316, the data discovery process 300 is completed and processing returns to step 206 of FIG. 2 to generate configuration data 120. The configuration data 120 is generated by the configuration engine and is stored in the data repository 114. The configuration data 120 provides the CDF system 108 with a variety of information specific to a particular user 104. Particularly, it includes information generated by the data discovery engine 131 in the data discovery process 300 as well as enterprise and transformation rules specific to the user 104. The configuration data 120 also includes information regarding the model data 118 as will be described further herein.

Figure 5:
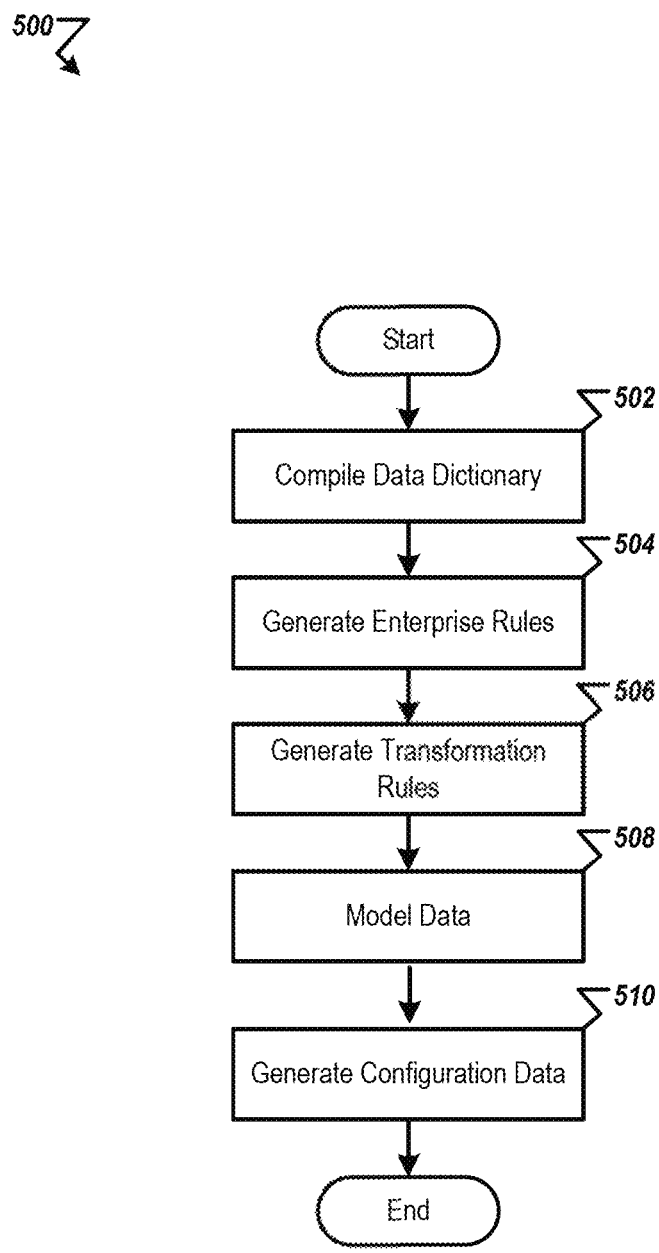
FIG. 5 is an exemplary flowchart of a process for generating the configuration data.

FIG. 5 illustrates an exemplary process 500 for generating configuration data 120. In one example, the configuration data 120 may take the form of a configuration file that can be accessed by the various engines of the CDF system 108 to perform data munging and generate reports based on source data 110 specific to particular users 104 and/or data formats. Initially, the configuration engine 142 compiles the data dictionary data 112 at step S502 which was generated in at step 316 of FIG. 3. Next, the configuration engine 142 causes the rules engine 138 to generate enterprise rules data 115. As previously described, the enterprise rules reflect various rules particular to the user 104 that need to be applied to the model data 118. These rules can reflect rules particular to a particular business using the CDF system 108. Some enterprise rules may be standard across industries and therefore can be automatically included in the configuration data 120 by the configuration engine 142. Further, enterprise rules may be submitted by users 104 via the GUI to the CDF system 108. Additionally, the rules engine 138 may automatically generate and recommend rules based on the types of data and relationships determined in the data discovery process 300. The enterprise rules data 115 is then stored in the configuration data file 120.

Next, transformation rules data 116 is similarly generated at step 504 by the configuration engine 142 via the rules engine 138. The transformation rules data 116 can be automatically generated by the rules engine 138 based on an analysis of the data determined via the data discovery process 300. For example, this could be based on particular profiling algorithms that need to adjust the data fields to perform accurate profiling. The transformation rules can also be applied to the CDF system 108 by user 104 via the GU. Once the rules are generated, the configuration engine 142 stores the transformation rules data 116 in the configuration data 120.

The configuration engine 142 then causes at step 508 the modeling engine 140 to generate model data 118 from the data discovered in the data discovery process 300 such as the data dictionary data 112. The modeling engine 140 determines a logical organization of this data such as identifying which tables the various data elements (and associated data) should be included in and how the data should be linked to other tables having other data elements. The model data 118 models the data by identifying particular user 104 lexicon to create tables identifying corresponding elements from data discovery with corresponding data having a different user 104 lexicon. Once the model data 118 links this information, it is then possible for the CDF system 108 to apply the enterprise and/or transformation rules against the data.

Once the model data 118 has been generated, the configuration engine 142 at step 510 combines the data dictionary data 112, the enterprise rules data 115, the transformation rules data 116 and the model data 118 and concatenates it within the configuration data 120. The configuration data 120 is then stored in the data repository 114. Accordingly, the configuration data 120, or configuration file, includes all of the information about user 104 data, including user-specific lexicons and rules, in one file. The data repository 114 may store a plurality of configuration files each of which correspond to a particular user 104 of the CDF system 108. This allows the CDF system 108 to provide all aspects of data munging without requiring manual interaction or recoding of any systems when new source data 110 is introduced. Accordingly, the CDF system 108 stores a record of the user 104 data specifically models it so that enterprise rules and transformation rules can be applied solely to the data from that particular user 104. Accordingly, the CDF system 108 not only provides for various users to perform data munging processes on a single platform, but it also enhances storage paradigms by having the configuration data 120 which reduces the memory burden on the CDF system 108. The configuration data 120 is specifically tailored to the specifics of the user 104 and therefore only information important to the user 104 based on analysis and mining of the data is required to be stored in the configuration data 120. Therefore, in addition to enhancing conventional data techniques by providing quicker processing of data, the CDF system 108 further reduces the processing burden of the data munging process via the application of user-tailored configuration data 120. This configuration data 120 can only be generated by the configuration engine 142 based on profiling algorithms and data mining artificial intelligence that could not be performed by a human due to the complexity and volume of incoming source data 110. Therefore, conventional data discovery, data mining engine process delays source data changes. Therefore, the process 500 of generating the configuration data 120 which provides the above-noted advantageous features is necessarily rooted in technology and further solves a variety of technical problems arising out of data management.

FIG. 6 is an exemplary illustration of configuration data 120 according to one example. As illustrated, the configuration data includes information of the data dictionary 112 generated during data discovery such as element names, element origins, element types and the table in which the element information is included within the model data 118. The configuration data 120 also includes enterprise rules data 115 such as the application of max, min values based on loan type. An enterprise ID is included so that the CDF system 108 can identify the particular user 104 and/or rule. Further, transformation rules data 116 is included such as rules for providing additional nomenclature of the element name as amt_note and filter criteria. This example provides a single record of information regarding a particular element derived from the source data 110. It is of course understood that the configuration data 120 will include data for all information of the data discovery process such as the data dictionary data 112 as well as applicable enterprise rule data 115, transformation rules data 116 and model data 118. It will also include primary key identification information for a record such as a loan number. Filter criteria can be included such as, in this example, a loan value amount of greater than $500K as well as a filter option indicating that the values cannot be null values thereby keeping them aligned with amt_note.

Figure 7:
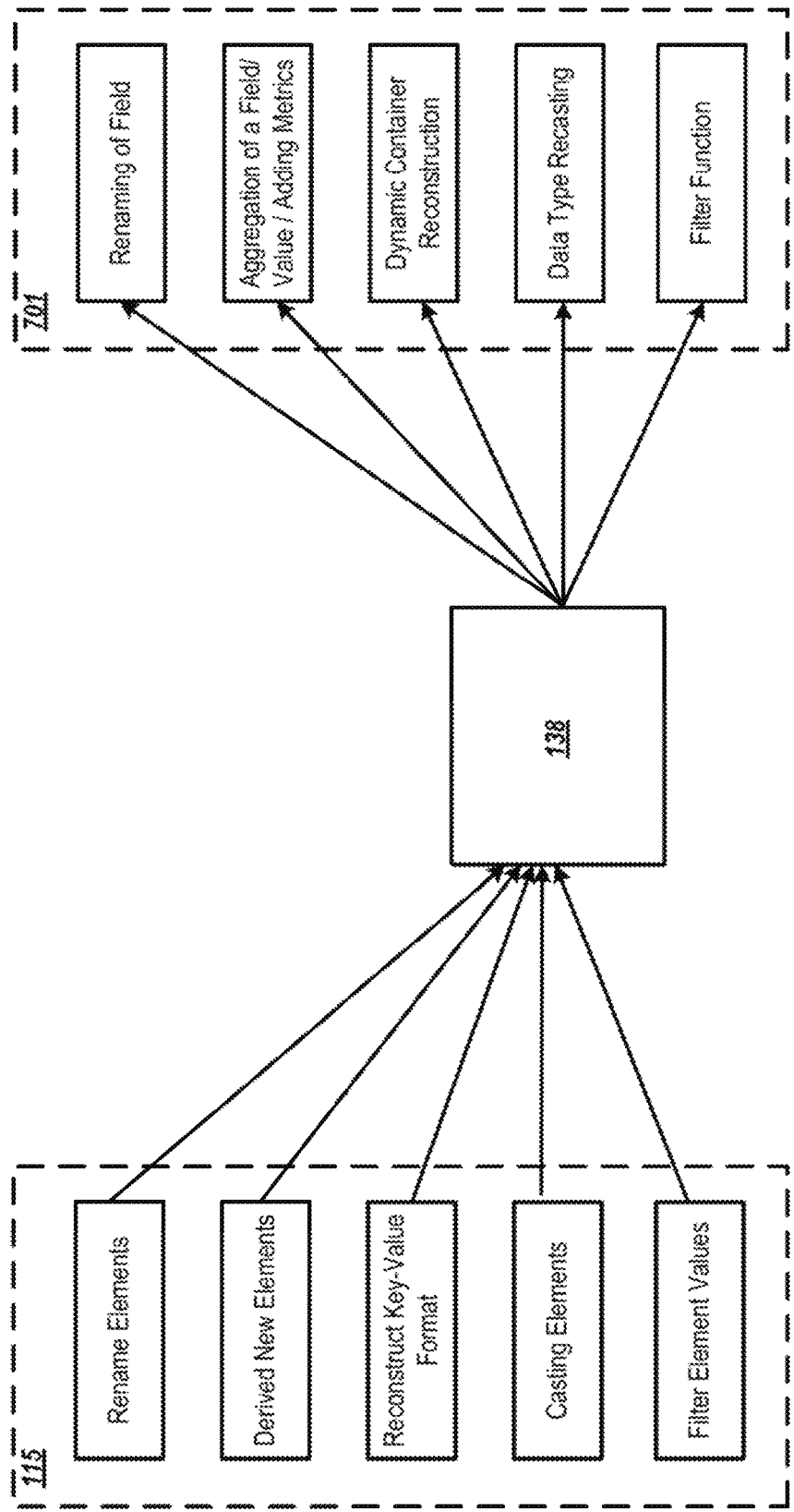
FIG. 7 is an exemplary application of enterprise rules to model data.

Returning to FIG. 2, once the configuration data 120 is generated at step 206, the process 200 proceeds to applying the applicable enterprise and/or transformation rules. These rules are applied to the model data 118 by the rules engine 138 as the model data 118 provides the logical organization and data lexicons required for the rules engine 138 to be able to identify the correct data in which to apply the enterprise and/or transformation rules. FIG. 7 illustrates an exemplary application by the rules engine 138 of enterprise rules data 115 and their application to the model data 118 to generate updated data. The rules engine 138 receives and/or generates rules and processes these inputs to generate outputs modifying the existing data based on the rules. For example, the enterprise rules data 115 may include a variety of rules such as renaming XML elements using standard naming conventions, deriving new elements by aggregation for a given Key Performance Indicator (KPI), constructing key-value formats from data that is changing from file to file for the same source, casting elements to the desired target types, and filtering element values based on given criteria. Once processed by the rules engine 138, updated outputs are generated and applied to the model data 118. For example, now that the relationships of data are identified by the data discovery engine 131, the system can use the output from the data discovery engine 131 and the enterprise rules data 115 to create the data model 118 and input to the configuration data 120.

Some enterprise rules can be set in advance by the user 104 or auto-generated by the rules engine 138 to be applied to all model data 118 even as new source data 110 is coming into the CDF system 108. Therefore, the CDF system 108 can dynamically update incoming data based on the application of standard rules. Otherwise, the rules engine 138 may designate particular rules to be applied to particular sets of data or based on data type and data values. Thus, the user 104 will always have the ability to generate data analytics knowing that the user-specific rules are being implemented on all of the data regardless of incoming format. This obviates the need to recode anything as new data enters the system and thereby provides yet another technical improvement to the data munging process.

Returning to FIG. 2, once the rules have been applied to the model data 118, the process 200 proceeds to step 210 in which data sanity is again performed on the model data by the data sanity engine 144, a detailed description of which has been provided above.

Next, the process 200 proceeds to step 212 in which dynamic DDL generation is implemented by the data management engine 130 to update the configuration data 120 with physical names of a target database. DDL is then dynamically generated from the configuration data 120 to create tables as loaded data 122 which is stored in the data repository 114. PySpark™ scripts and Apache Hive™ can be used as part of this process. PySpark™ is an Apache™ Spark Python™ API that exposes the Spark™ programming model to Python™. Apache Spark™ is a fast and general engine for large-scale data processing allowing for applications to be written quickly in languages such as Java™, Scala™ and Python™. Python™ is an interpreted, interactive, object-oriented programming language designed to let users integrate systems more effectively. Apache Hive™ is a data warehouse platform that facilitates reading, writing and managing of large datasets residing in distributed storage using SQL. Therefore, in one exemplary implementation, DDL is dynamically generated to create tables by the data management engine via PySpark™ scripts which then load the tables into Apache Hive™ at step 214. Then the data management engine 130 performs data movement control at step 216 by comparing the data moved between Hive™ and Appraisal Data Analytics (ADA). At this point, the process proceeds to step 218 where the system checks if all the data processes are completed successfully and notifies the user 104 at which point the user 104 may interact with the CDF system 108 to generate a variety of data analytics reports via the GUI.

Figure 8:
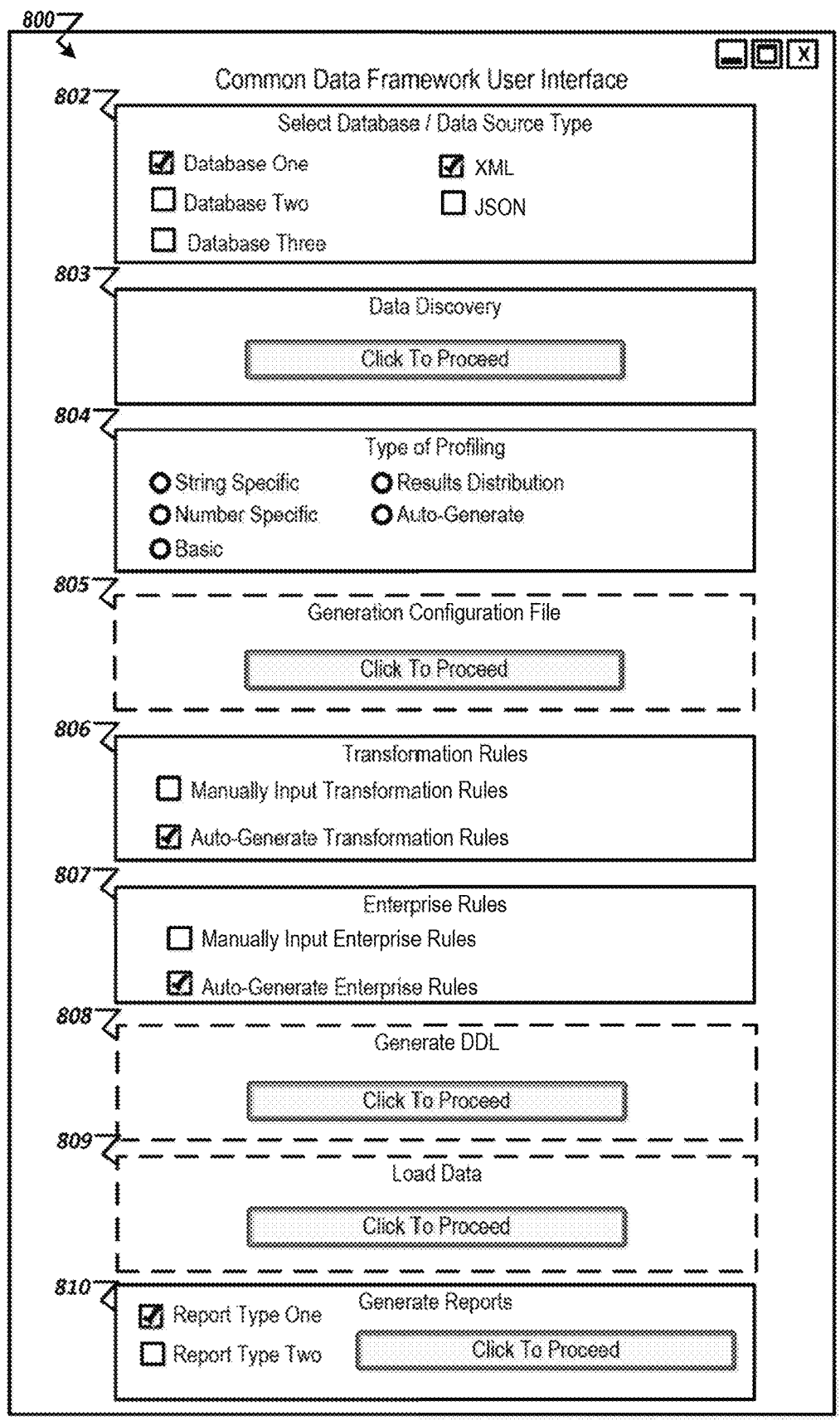
FIG. 8 is an exemplary graphical user interface (GUI) for interacting with the CDF system.

FIG. 8 illustrates an exemplary GUI 800 of the CDF system 108 according to one example. As illustrated, the GUI 800 includes a variety of windows that can be used by users 104 or developers 107 to perform a variety of actions within the CDF system 108. Initially, it is noted that the developers 107 have access to all of the features of the GUI 800 whereas the users 104 would not have access to generating configuration files 805, generating DDL 807 and loading the data 809. Accordingly, these interfaces are marked with dotted lies in FIG. 8. Window 802 provides the ability to select one or more databases 106 from which the CDF system 108 should receive/obtain source data 110. Window 803 provides for the ability to perform data discovery which could be used as additional data is provided to the system. Window 804 provides the ability to perform one or more profiling algorithms on their data such as string specific, number specific, basic, and results distribution algorithms. The user 104 may also have the data profiling engine 137 auto-generate profiling algorithm recommendations to be used based on analysis of the data as previously described herein. Window 805 provides the developer 107 with the ability to manually generate a configuration file 120. Window 806 provides the ability to input enterprise rules or to have the rules engine 138 automatically generate enterprise rules based on analysis of the data as previously described herein. Window 807 similarly provides the ability to input transformation rules or to have the rules engine 138 automatically generate transformation rules based on analysis of the data as previously described herein. Window 808 allows the developer to perform DDL generation as described in FIG. 2. Window 809 allows the developer to manually load the data as descried in FIG. 2. Additionally, window 810 provides the ability to generate specific data analytics reports based on the data munging performed by the CDF system 108 of the user 104 source data 110.

Figure 9A:
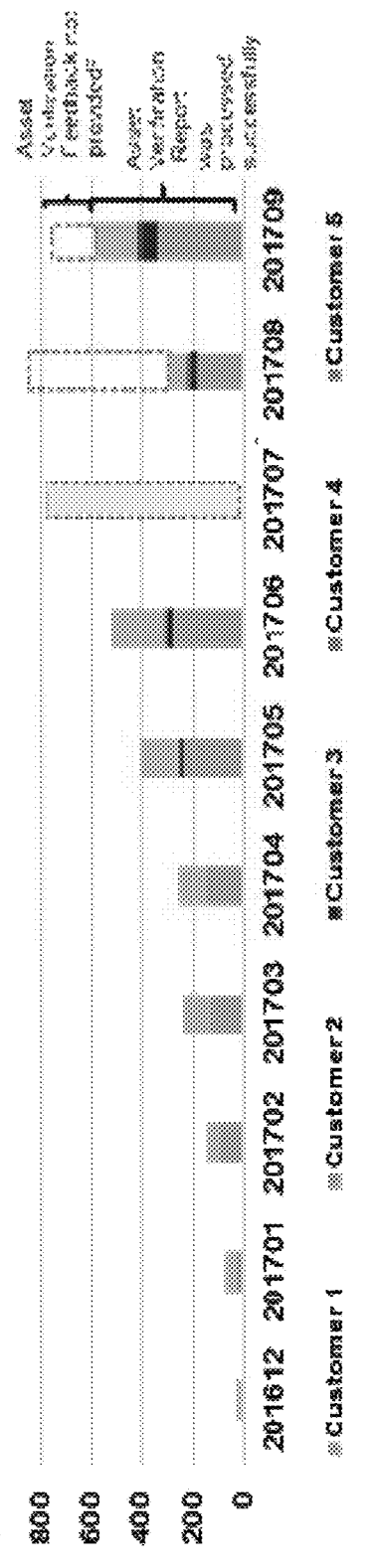
FIGS. 9A and 9B are exemplary illustrations of reports generated using the CDF system.
Figure 9B:
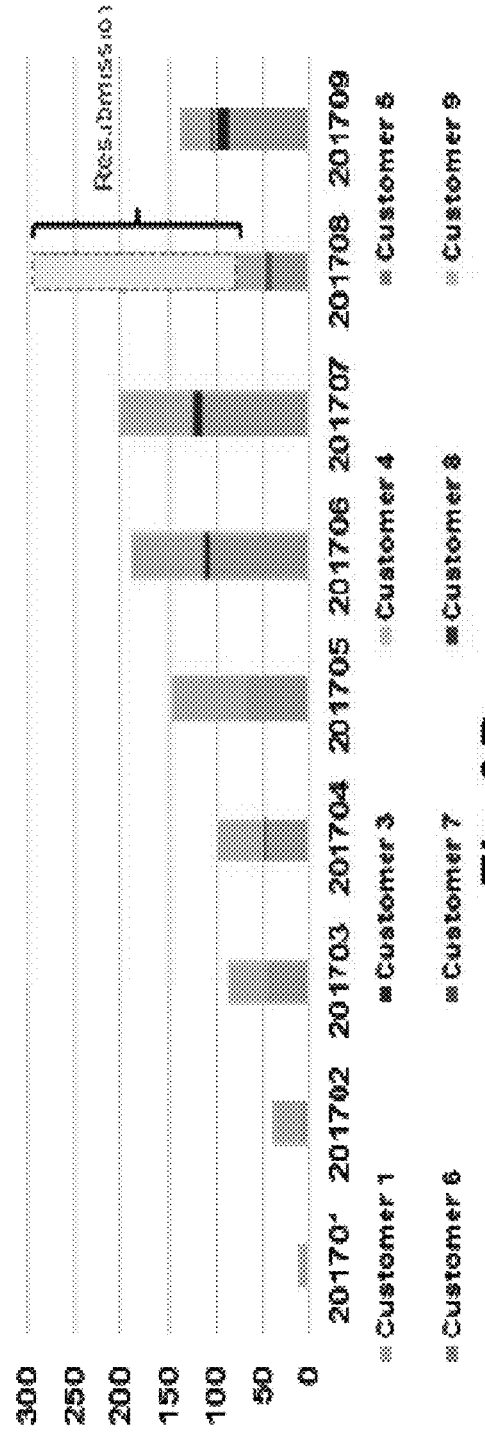

FIGS. 9A and 9B are exemplary illustrations of reports generated using the CDF system 108. In both figures, the x-axis represents the month and the y-axis represents the number of loans. FIG. 9A illustrates the number of loan applications with electronic asses for a variety of customers. This provides the ability to assess a borrower's capacity to pay the monthly payments. It also provides information regarding asset verification and whether it was successful and whether feedback was provided. FIG. 9B illustrates the number of funded loans with electronic assets. This shows the number of funded loans (i.e. loans that have been purchased) with electronic assets. It also provides additional information regarding the resubmission of loan applications. Therefore, although the system in this example would receive a large number of applications, the system can parse this information to identify the loans with assets and how they changed from application to funding.

The information including in FIGS. 9A and 9B could either have been in the originally received source data 110 or could have been absent from the source data 110 but generated by the CDF system 108 based on the above-noted processing of the source data 110. Accordingly, FIGS. 9A and 9B represent the ability of the CDF system 108 to quickly perform data munging on a large variety of information to provide real-time reports of data necessary for making fast and important business decisions. This data could not otherwise be obtained through traditional methods and a human-only approach would render the system meaningless with delay and likely introduce errors. Accordingly, the CDF system 108 is necessarily rooted in technology and solves a business challenge particular to technology.

Referring back to FIG. 2, the process 200 has completed and ends. Therefore, all of the source data 110 has been processed via the CDF system 108 and loaded into the system as loaded data 122 where the user 104 can access the data and perform analytics via the GUI 148. However, it is noted that the CDF system 108 is configured to dynamically update the data within the data repository 114 by continuously performing one or more steps of the process 200 as additional source data 110 is received by the CDF system 108.

Therefore, the CDF system 108 provides a plurality of technical solutions to the technical problem of performing accurate and efficient data munging. For example, the CDF system 108 provides for particular data structures such as the configuration data 120 which allows the CDF system 108 to perform data munging for a variety of users 104 without having to generate additional code or repeat data processing steps. Further, the use of the data structure of the configuration data 120 requires a minimal amount of data as it contains only the information required to perform data munging for a particular user. Therefore, the CDF system 108 improves the functionality of computer hardware implementing the system by reducing memory requirements and avoiding the storage of superfluous data. The configuration data 120 also allows the CDF system 108 to efficiently perform data munging by reducing the processing time significantly from conventional methods. The process 200 described herein not only automates various data munging steps but also enhances various steps of the process via the use of technical implementations of specific artificial intelligence data mining features. This provides more accurate data overall while improving the ability to provide better data analytics.

The CDF system 108 therefore provides a plurality of technical solutions to technical problems that have plagued the industry. Using the CDF system 108, users 104 will be provided with quicker access to more accurate data analytics which in today's fast-paced business environments allows for quick decisions to be made based on large volumes of data. The CDF system 108 also provides improvements to various technical fields such as data management, data filtering, data storage, data analytics, and as previously discussed, data munging. Therefore, the CDF system 108 provides more than a mere organization of data but instead provides a technically implemented data munging process necessarily routed in technology that provides faster and more accurate results while also reducing memory requirements.

Figure 10A:
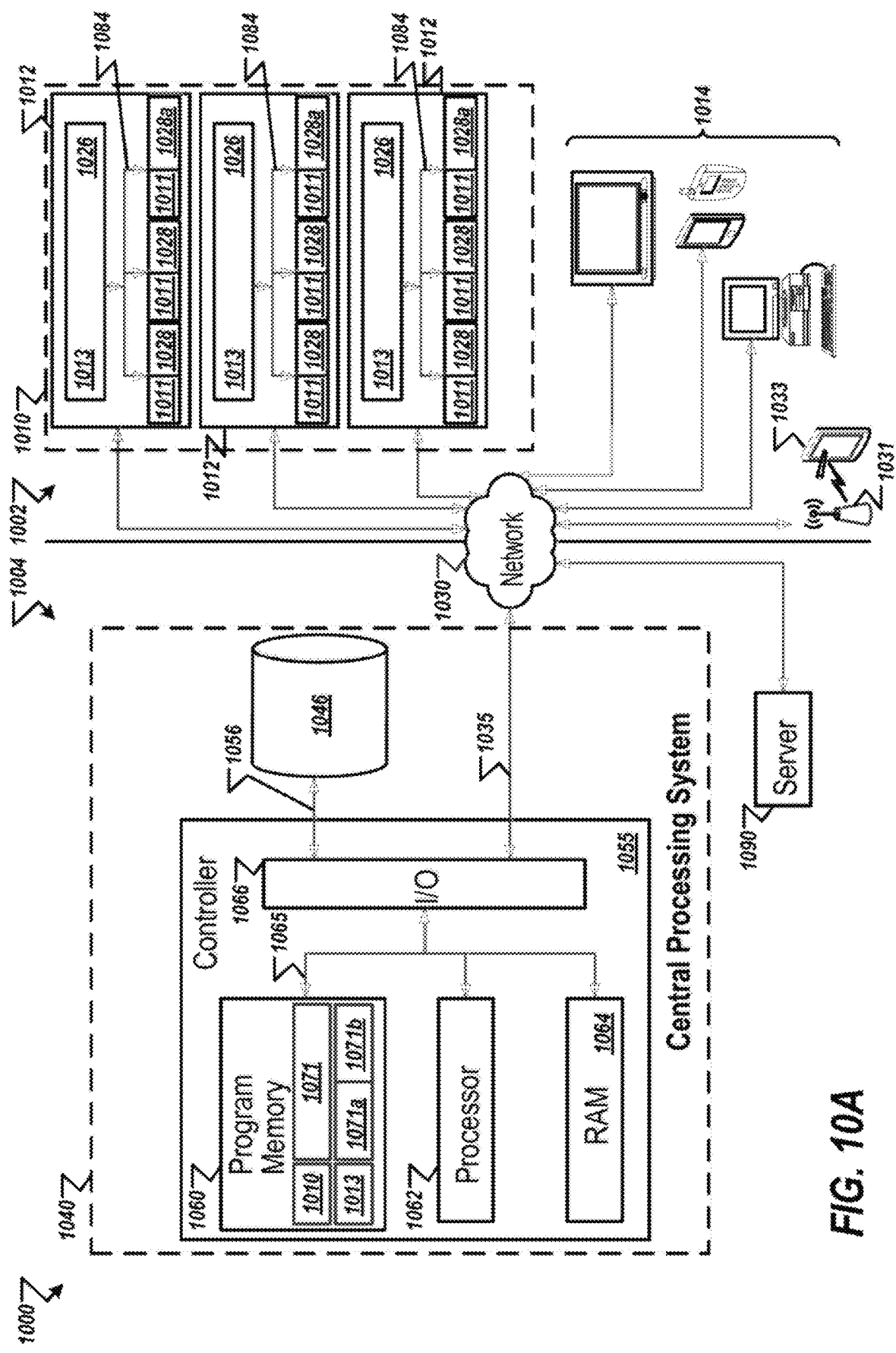
FIGS. 10A and 10B illustrate various aspects of an exemplary architecture implementing a platform for generation and operation of the CDF.
Figure 10B:
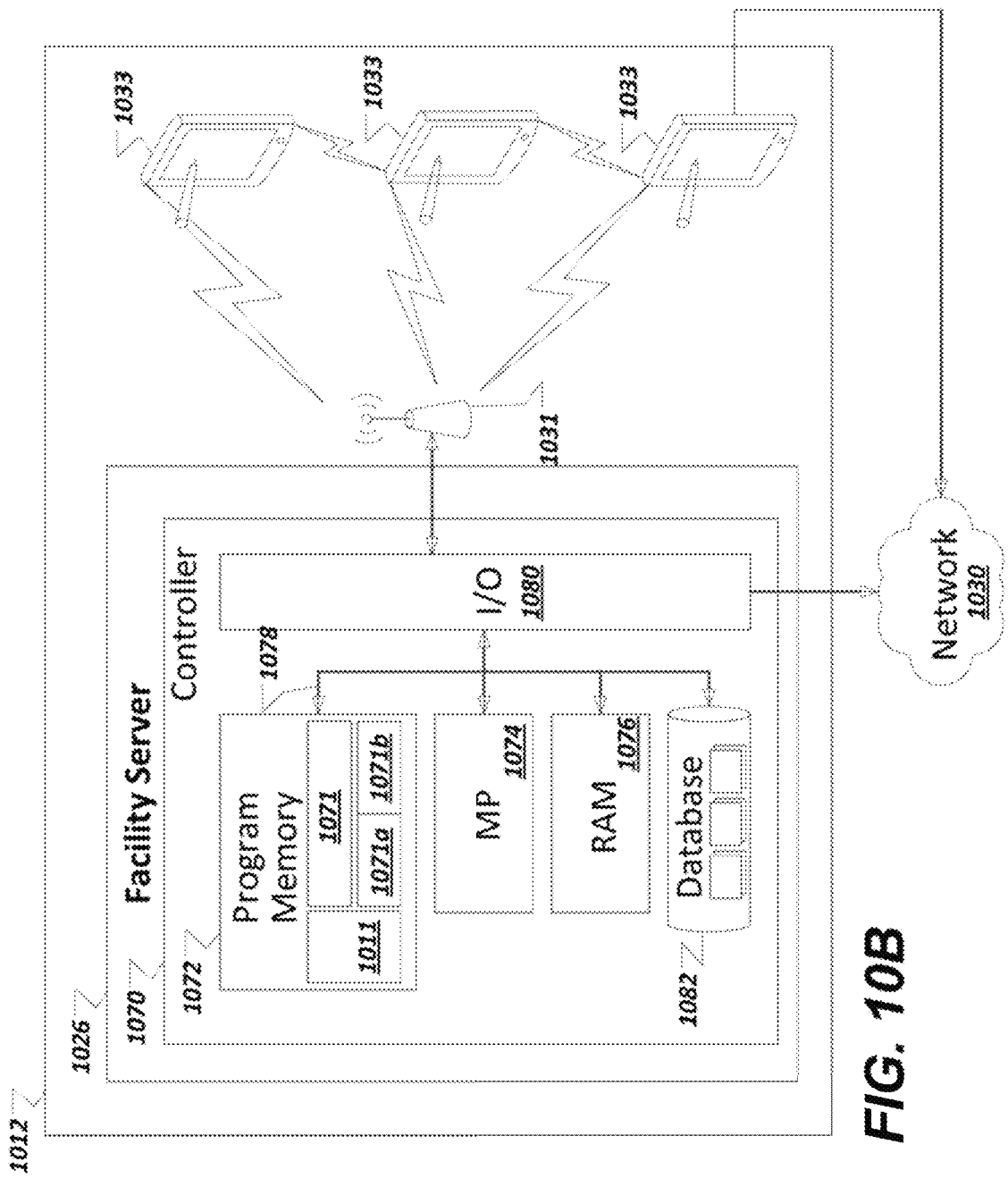

FIGS. 10A and 10B illustrate various aspects of an exemplary architecture implementing a platform 1000 for implementing the processes described herein. The high-level architecture includes both hardware and software applications, as well as various data communications channels for communicating data between the various hardware and software components. The platform 1000 may be roughly divided into front-end components 1002 and back-end components 1004. The front-end components 1002 are primarily disposed within a user network 1010 including one or more users 1012. The users 1012 may be located, by way of example rather than limitation, in separate geographic locations from each other, including different areas of the same city, different cities, different states, or even different countries. The front-end components 1002 may include a number of workstations 1028. The workstations 1028, for example, can be local computers located in the various locations 1012 throughout the network 1010 and executing various applications of the processes described herein.

Web-enabled devices 1014 (e.g., personal computers, tablets, cellular phones, smart phones, web-enabled televisions, etc.) may be communicatively connected to locations 1012 and the system 1040 through a digital network 1030 or a wireless router 1031, as described below.

The front-end components 1002, in some embodiments, include a number of facility servers 1026 disposed at the number of locations 1012 instead of, or in addition to, a number of workstations 1028. Each of the locations 1012 may include one or more facility servers 1026 that may facilitate communications between the web-enabled devices 1014 and the back-end components 1004 via a digital network 1030, described below, and between the terminals 1028, 1028A of the locations 1012 via the digital network 1030, and may store information for a number of users/accounts/etc. associated with each facility. Of course, a local digital network 1084 may also operatively connect each of the workstations 1028 to the facility server 1026. Unless otherwise indicated, any discussion of the workstations 1028 also refers to the facility servers 1026, and vice versa. Moreover, environments other than the locations 1012, such as the kiosks, call centers, and Internet interface terminals may employ the workstations 1028, the web-enabled devices 1014, and the servers 1026. As used herein, the term "location" refers to any of these points of contact (e.g., call centers, kiosks, Internet interface terminals, etc.) in addition to the locations 1012, etc. described above.

The front-end components 1002 communicate with the back-end components 1004 via the digital network 1430. One or more of the front-end components 1002 may be excluded from communication with the back-end components 1004 by configuration or by limiting access due to security concerns. For example, the web enabled devices 1014 may be excluded from direct access to the back-end components 1004. In some embodiments, the locations 1012 may communicate with the back-end components via the digital network 1030. In other embodiments, the locations 1012 and web-enabled devices 1014 may communicate with the back-end components 1004 via the same digital network 1030, but digital access rights, IP masking, and other network configurations may deny access of the web-enabled devices 1014. The web-enabled devices may also connect to the network 1030 via the encrypted, wireless router 1031.

The digital network 1030 may be a proprietary network, a secure public Internet, a virtual private network or some other type of network, such as dedicated access lines, plain ordinary telephone lines, satellite links, combinations of these, etc. Where the digital network 1030 includes the Internet, data communication may take place over the digital network 1030 via an Internet communication protocol. In addition to one or more web servers 1090 (described below), the back-end components 1004 may include a central processing system 1040 within a central processing facility. Or course, the locations 1012 may be communicatively connected to different back-end components 1004 having one or more functions or capabilities that are similar to the central processing system 1040. The central processing system 1040 may include processing circuitry (e.g., one or more computer processors) 1062 adapted and configured to execute various software applications and components of the platform 1000, in addition to other software applications.

The central processing system 1040, in some embodiments, further includes a database 1046, such as data repository 114 (which may include one or more databases). The database 1046 can be adapted to store data related to the operation of the platform 1000. The central processing system 1040 may access data stored in the database 1046 when executing various functions and tasks associated with the operation of the platform 1000.

Although the platform 1000 is shown to include a central processing system 1040 in communication with three locations 1012, and various web-enabled devices 1014 it should be understood that different numbers of processing systems, locations, and devices may be utilized. For example, the digital network 1030 (or other digital networks, not shown) may interconnect the platform 1000 to a number of included central processing systems 1040, hundreds of locations 1012, and thousands of web-enabled devices 1014. According to the disclosed example, this configuration may provide several advantages, such as, for example, enabling near real-time uploads and downloads of information as well as periodic uploads and downloads of information. This provides for a primary backup of all the information generated in the wireless data transfer process. Alternatively, some of the locations 1012 may store data locally on the facility server 1026 and/or the workstations 1028.

FIG. 10A also depicts one possible embodiment of the central processing system 1040. The central processing system 1W may have a controller 1055 operatively connected to the database 1046 via a link 1056 connected to an input/output (I/O) circuit 1066. It should be noted that, while not shown, additional databases may be linked to the controller 1055 in a known manner.

The controller 1055 includes a program memory 1060, the processing circuitry 1062 (may be called a microcontroller or a microprocessor), a random-access memory (RAM) 1064, and the input/output (I/O) circuit 1066, all of which are interconnected via an address/data bus 1065. It should be appreciated that although only one microprocessor 1062 is shown, the controller 1055 may include multiple microprocessors 1062. Similarly, the memory of the controller 1055 may include multiple RAMs 1064 and multiple program memories 1060. Although the I/O circuit 1066 is shown as a single block, it should be appreciated that the I/O circuit 1066 may include a number of different types of I/O circuits. The RAM(s) 1064 and the program memories 1060 may be implemented as semiconductor memories, magnetically readable memories, and/or optically readable memories, for example. A link 1035 may operatively connect the controller 1055 to the digital network 1030 through the I/O circuit 1066.

FIG. 10B depicts one possible embodiment of the front-end components 1002 located in one or more of the locations 1012 from FIG. 10A. Although the following description addresses the design of the locations 1012, it should be understood that the design of one or more of the locations 1012 may be different from the design of others of the locations 1012. Also, each of the locations 1012 may have various different structures and methods of operation. It should also be understood that while the embodiment shown in FIG. 10B illustrates some of the components and data connections that may be present in a location 1012, it does not illustrate all of the data connections that may be present in a location 1012. For exemplary purposes, one design of a location is described below, but it should be understood that numerous other designs may be utilized.

Each of the locations 1012, as illustrated, has one or more portable computing devices 1033 (e.g., notebook computers, tablet computers, smart phones, personal data assistants, etc.) and/or a facility server 1026. The digital network 1084 and wireless router 1031 operatively connect the facility server 1426 to the number of portable computing devices 1033 and/or to other web-enabled devices 1014 and workstations 1028. The digital network 1030 may be a wide area network (WAN), a local area network (LAN), or any other type of digital network readily known to those persons skilled in the art. The digital network 1030 may operatively connect the facility server 1026, the portable computing devices 1033, the workstations 1028, and/or the other web-enabled devices 1014 to the central processing system 1040.

Each portable computing device 1033, workstation 1028, user device terminal 1028a, or facility server 1026 includes a controller 1070, as depicted in FIG. 10B in relation to the server 1026. Similar to the controller 1055 from FIG. 10A, the controller 1070 includes a program memory 1072, processing circuitry (e.g., one or more microcontrollers or microprocessors) 1074, a random-access memory (RAM) 1076, and an input/output (I/O) circuit 1080, all of which are interconnected via an address/data bus 1078. In some embodiments, the controller 1070 may also include, or otherwise be communicatively connected to, a database 1082. The database 1082 (and/or the database 1046 of FIG. 10A) includes data such as the data stored in the data repository 114 (FIG. 1). As discussed with reference to the controller 1055, it should be appreciated that although FIG. 10B depicts only one microprocessor 1074, the controller 1070 may include multiple microprocessors 1074. Similarly, the memory of the controller 1070 may include multiple RAMs 1076 and multiple program memories 1072. Although the FIG. 10B depicts the I/O circuit 1080 as a single block, the I/O circuit 1080 may include a number of different types of I/O circuits. The controller 1070 may implement the RAM(s) 1076 and the program memories 1072 as semiconductor memories, magnetically readable memories, and/or optically readable memories, for example.

Either or both of the program memories 1060 (FIG. 10A) and 1072 may also contain machine-readable instructions (i.e., software) 1071, for execution within the processing circuitry 1062 (FIG. 10A) and 1074, respectively. The software 1071 may perform the various tasks associated with operation of the location or locations, and may be a single module 1071 or a number of modules 1071a, 1071b. While the software 1071 is depicted in FIGS. 10A and 10B as including two modules, 1071a and 1071b, the software 1071 may include any number of modules accomplishing tasks related to location operation.

In addition to the controller 1070, the portable computing devices 1033, the workstations 1028 and the other web-enabled devices 1014 may further include a display and a keyboard as well as a variety of other input/output devices (not shown) such as a scanner, printer, mouse, touch screen, track pad, track ball, isopoint, voice recognition system, digital camera, bar code scanner, RFID reader, etc. A user 104 may sign on and occupy each portable computing device 1033, workstation 1028 or user device terminal 1028a to assist the user in performing his or her duties. Users 104 may sign onto the portable computing device 1033, workstation 1028 or the user device terminal 1028a using any available technique, such as entering a user name and password. If a user signs on to the system using a portable computing device 1033, the network 1084 communicates this information to the facility server 1026, so that the controller 1070 may identify which users are signed onto the platform 1000 and which portable computing device 1033, workstation 1028 or user device terminal 1028a the user is signed onto.

Various software applications resident in the front-end components 1002 and the back-end components 1004 implement functions related to location operation, and provide various user interface means to allow users to access the platform 1000. One or more of the front-end components 1002 and/or the back-end components 1004 may include a user-interface application 1011 for allowing a user to input and view data associated with the platform 1000, and to interact with the platform described herein, such as GUI 900. In one embodiment, the user interface application 1011 is a web browser applicant, and the facility server 1026 or the central processing system 1040 implements a server application 1013 for providing data to the user interface application 1011. However, the user interface application 1011 may be any type of interface, including a proprietary interface, and may communicate with the facility server 1026 or the central processing system 1040 using any type of protocol including, but not limited to, file transfer protocol (FTP), telnet, hypertext-transfer protocol (HTTP), etc. Moreover, some embodiments may include the user interface application 1011 running on one of the web-enabled devices 1014, while other embodiments may include the application 1011 running on the portable computing device 1033 in a location 1012. The central processing system 1040 and/or the facility server 1026 may implement any known protocol compatible with the user-interface application 1411 running on the portable computing devices 1033, the workstations 1028 and the web-enabled devices 1014 and adapted to the purpose of receiving and providing the necessary information during the data transfer process.

Figure 10C:
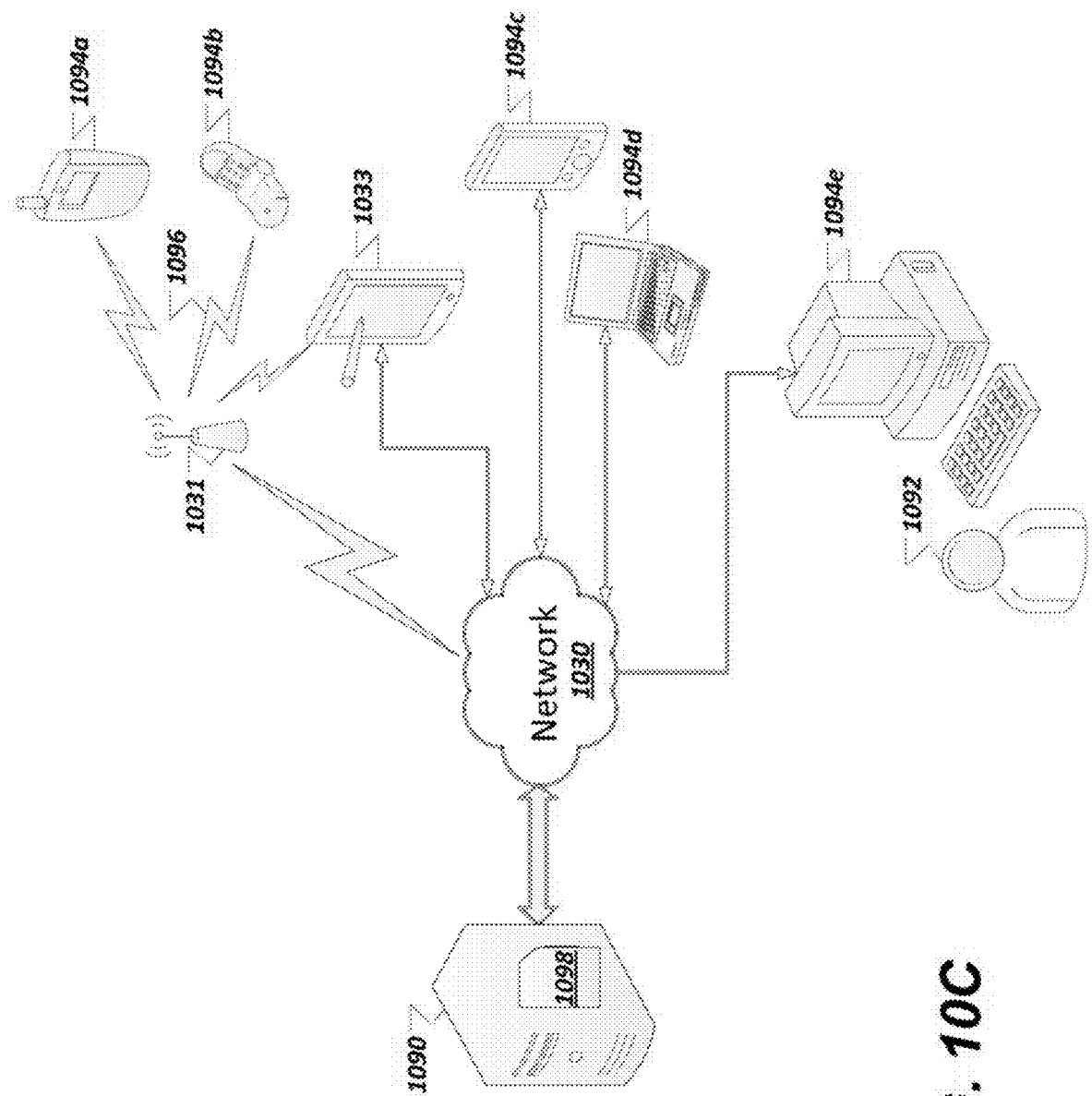
FIGS. 10C and 10D illustrate an example server interface for connecting user computing devices within the platform for generation and operation of the CDF.

For purposes of implementing the platform 1000, the user interacts with location systems (e.g., the central processing system 1040) via a number of web pages. FIG. 10C depicts a web server 1090 connected via the network 1030 to a number of portable computing devices 1033 and other web-enabled devices through which a user 1092 may initiate and interact with the platform 1000. The web enabled devices may include, by way of example, a smart-phone 1094a, a web-enabled cell phone 1094b, a tablet computer 1033, a personal digital assistant (PDA) 1094c, a laptop computer 1094d, a desktop computer 1094e, a portable media player (not shown), etc. Of course, any web-enabled device appropriately configured may interact with the platform 1000. The web-enabled devices 1033 and 1094 need not necessarily communicate with the network 1030 via a wired connection. In some instances, the web enabled devices 1033 and 1094 may communicate with the network 1030 via wireless signals 1096 and, in some instances, may communicate with the network 1030 via an intervening wireless or wired device 1031, which may be a wireless router, a wireless repeater, a base transceiver station of a mobile telephony provider, etc. Each of the web-enabled devices 1033 and 1094 may interact with the web server 1490 to receive web pages, such as the web page 1098 depicted in FIG. 10C, for display on a display associated with the web-enabled device 1033 and 1094. It will be appreciated that although only one web server 1090 is depicted in FIG. 10C, multiple web servers 1090 may be provided for the purpose of distributing server load, serving different web pages, implementing different portions of the location web interface, etc.

Figure 10D:
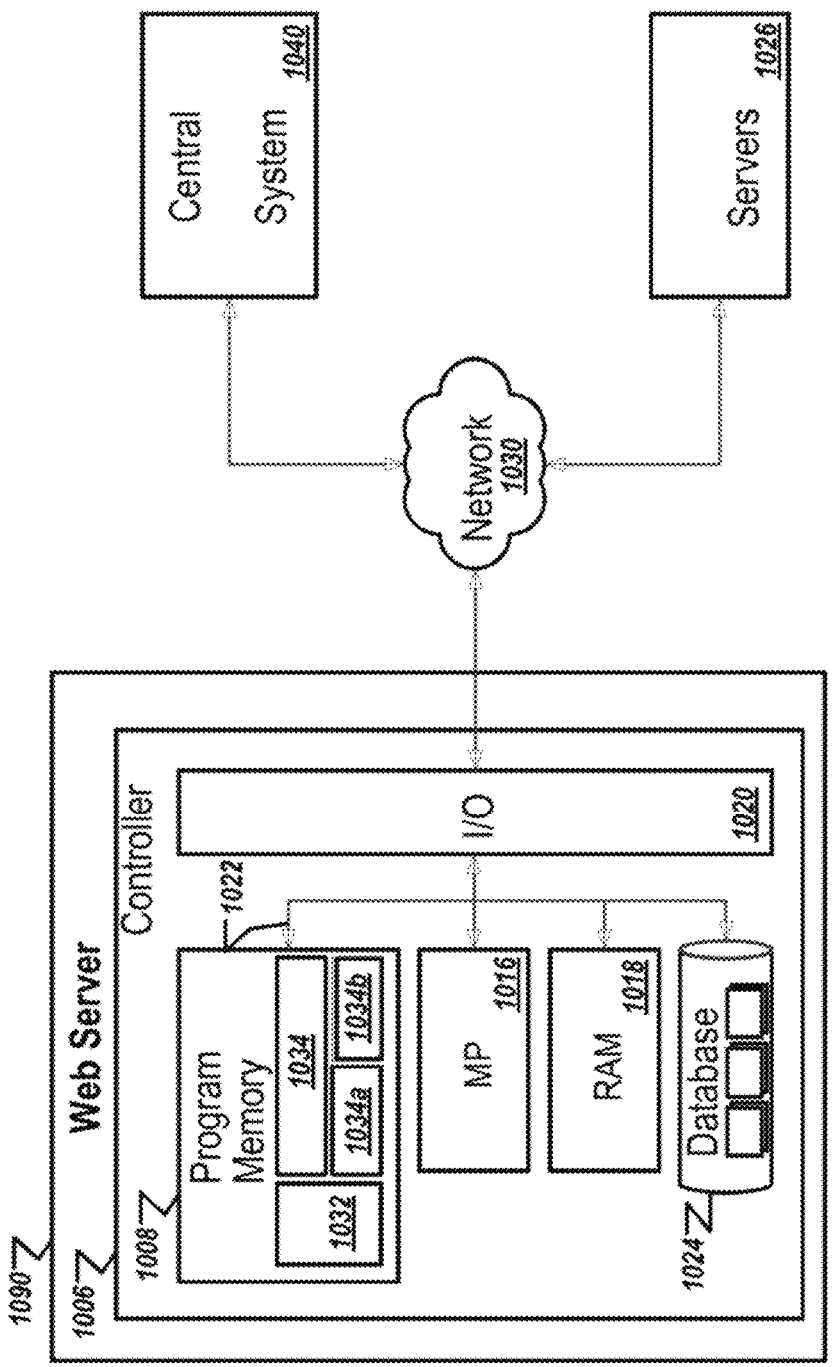

Turning now to FIG. 10D, the web server 1090, like the facility server 1026, includes a controller 1006. Similar to the controllers 1055 and 1070, the controller 1006 includes a program memory 1008, processing circuitry (e.g., one or more microcontrollers or microprocessors) 1016, a random-access memory (RAM) 1018, and an input/output (I/O) circuit 1420, all of which are interconnected via an address/data bus 1022. In some embodiments, the controller 1006 may also include, or otherwise be communicatively connected to, a database 1024 or other data storage mechanism (e.g., one or more hard disk drives, optical storage drives, solid state storage devices, etc.). The database 1024 may include data such as external source web profiles, product data, web page templates and/or web pages, and other data necessary to interact with the user 1092 through the network 1030. As discussed with reference to the controllers 1055 and 1070, it should be appreciated that although FIG. 10D depicts only one microprocessor 1016, the controller 1006 may include multiple microprocessors 1016. Similarly, the memory of the controller 1006 may include multiple RAMs 1018 and multiple program memories 1008. Although the FIG. 10D depicts the I/O circuit 1020 as a single block, the I/O circuit 1020 may include a number of different types of I/O circuits. The controller 1006 may implement the RAM(s) 1018 and the program memories 1008 as semiconductor memories, magnetically readable memories, and/or optically readable memories, for example.

In addition to being connected through the network 1030 to the user devices 1033 and 1094, as depicted in FIG. 10C, FIG. 10D illustrates that the web server 1090 may also be connected through the network 1030 to the central processing system 1040 and/or one or more facility servers 1026. As described below, connection to the central processing system 1040 and/or to the one or more facility servers 1026 facilitates the platform 1000.

The program memory 1008 and/or the RAM 1418 may store various applications for execution by the processing circuitry 1016. For example, an application 1032 may provide a user interface to the server, which user interface may, for example, allow a network administrator to configure, troubleshoot, or test various aspects of the server's operation, or otherwise to access information thereon. A server application 1034 operates to populate and transmit web pages to the web-enabled devices 1094, receive information from the user 1092 transmitted back to the server 1090, and forward appropriate data to the central processing system 1040 and the facility servers 1026, as described below. Like the software 1071, the server application 1034 may be a single module 1034 or a number of modules 1034a, 1034b. While the server application 1034 is depicted in FIG. 10D as including two modules, 1034a and 1034b, the server application 1034 may include any number of modules accomplishing tasks related to implantation of the web server 1090. By way of example, the module 1034a may populate and transmit the web pages and/or may receive and evaluate inputs from the user 1092 to facilitate in the wireless transfer of data from a first tablet to a second tablet, while the module 1034b may communicate with one or more of the back end components to provide the requested data.

Typically, a user may launch or instantiate a user interface application (e.g., a web browser or other submitter or reviewer application) from a web-enabled device, such as the web-enabled devices 1033 and 1094, to access the web server 1090 cooperating with the system 1040 to implement the platform 1000.

One or more processors can be utilized to implement any functions and/or algorithms described herein, unless explicitly stated otherwise. Additionally, any functions and/or algorithms described herein, unless explicitly stated otherwise, can be performed upon virtual processing circuitry (e.g., one or more virtual processors, for example on one or more physical computing systems such as a computer farm or a cloud drive).

Reference has been made to flowchart illustrations and block diagrams of methods, systems and computer program products according to implementations of this disclosure. Aspects thereof are implemented by computer program instructions. These computer program instructions may be provided to processing circuitry of a general purpose computer, special purpose computer, or other programmable data processing apparatus to produce a machine, such that the instructions, which execute via the processing circuitry of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processing circuitry (e.g., processors and/or programmable circuits) configured to execute program code and/or computer instructions to execute the functions, processes and algorithms described herein. Additionally, some implementations may be performed on modules or hardware not identical to those described. Accordingly, other implementations are within the scope that may be claimed.

The invention claimed is:

1. A device comprising:
   memory; and
   processing circuitry configured to
   receive source data having one or more formats from a data source;
   analyze the source data, including
   identifying data element types and data element values of the source data;
   automatically selecting more than one profiling algorithm from a plurality of profiling algorithms based on the identified data element types of the source data and limiting the source data to particular values based on each of the more than one profiling algorithm, each of the more than one profiling algorithm being automatically generated based on processing of the source data, each of the more than one profiling algorithm defining a different way for characterizing data elements of the source data;
   profiling the source data using the more than one profiling algorithm to generate profiling data and data analytics, the profiling data representing the characterizations of the data elements;

identifying outlier data elements in the source data based on the profiling data;
removing the identified outlier data elements from the data elements of the source data; and
mining the source data to generate mining data, the mining data identifying at least one relationship or correlation among the data elements of the source data;
generate a data dictionary including the identified data element types, the identified data element values, the profiling data, and the mining data;
generate and store in the memory a configuration file having the data dictionary; and
generate and store in the configuration file a data model logically organizing the data elements from the data dictionary in a common format.

2. The device of claim 1, wherein
the analyzing of the source data includes identifying data paths relating the data elements to the source data, and
the data dictionary includes the identified data paths.

3. The device of claim 2, wherein
the more than one profiling algorithm are automatically selected as a function of the data elements and the data paths, and
the different ways for characterizing the data elements include characterizing the data elements in terms of at least two of an amount of data types, standard deviations, average data values, data ranges, or outliers.

4. The device of claim 1, wherein the data model logically organizes the data elements based on data identifiers particular to the data source.

5. The device of claim 1, wherein the processing circuitry is further configured to generate and store in the configuration file one or more transformation rules identifying formatting changes to the data elements in the data model based on a type of the data elements from the data dictionary.

6. The device of claim 5, wherein the processing circuitry is configured to reformat the data elements in the data model as a function of the one or more transformation rules.

7. The device of claim 1, wherein the processing circuitry is further configured to generate one or more enterprise rules identifying formatting changes to data elements in the data model based on the data source.

8. The device of claim 7, wherein the processing circuitry is configured to reformat the data elements in the data model as a function of the one or more enterprise rules.

9. The device of claim 1, wherein the processing circuitry is further configured to generate analytic reporting data using the configuration file.

10. The device of claim 1, wherein the source data has two or more formats.

11. The device of claim 1, wherein the configuration file includes information identifying the more than one profiling algorithm.

12. The device of claim 1, wherein, when the processing circuitry receives additional source data in a different format from the data source, the processing circuitry analyzes the additional source data and updates the configuration file based on the analysis of the additional source data, the updated configuration file having an updated data dictionary and updated model data having a common data format for the source data and the additional source data.

13. The device of claim 1, wherein
the source data is received from a plurality of data sources, and
the processing circuitry generates a configuration file for source data from each of the plurality of data sources.

14. The device of claim 1, wherein machine learning is used to associate profiling algorithms with data element types, such that the automatic selection of the more than one profiling algorithm is updated using the machine learning.

15. The device of claim 1, wherein the data model identifies tables that the data elements should be included in and links to other tables having other data elements.

16. The device of claim 1, wherein the data model is generated by identifying a particular lexicon to create tables identifying the data elements with corresponding data having a different lexicon.

17. A method comprising:
receiving source data having one or more formats from a data source;
analyzing, via processing circuitry, the source data, including
identifying data element types and data element values of the source data;
automatically selecting more than one profiling algorithm from a plurality of profiling algorithms based on the identified data element types of the source data and limiting the source data to particular values based on each of the more than one profiling algorithm, each of the more than one profiling algorithm being automatically generated based on processing of the source data, each of the more than one profiling algorithm defining a different way for characterizing data elements of the source data;
profiling the source data using the more than one profiling algorithm to generate profiling data and data analytics, the profiling data representing the characterizations of the data elements;
identifying outlier data elements in the source data based on the profiling data;
removing the identified outlier data elements from the data elements of the source data; and
mining the source data to generate mining data, the mining data identifying at least one relationship or correlation among the data elements of the source data;
generating, via the processing circuitry, a data dictionary including the identified data element types, the identified data element values, the profiling data, and the mining data;
generating, via the processing circuitry and storing in memory, a configuration file having the data dictionary; and
generating, via the processing circuitry and storing in the configuration file, a data model logically organizing the data elements from the data dictionary in a common format.

18. The method of claim 17, wherein machine learning is used to associate profiling algorithms with data element types, such that the automatic selection of the more than one profiling algorithm is updated using the machine learning.

19. A non-transitory computer-readable medium having stored thereon computer-readable instructions which when executed by a computer cause the computer to perform a method comprising:
receiving source data having one or more formats from a data source;
analyzing the source data, including
identifying data element types and data element values of the source data;
automatically selecting more than one profiling algorithm from a plurality of profiling algorithms based on the identified data element types of the source data and limiting the source data to particular values based on each of the more than one profiling algorithm, each of the more than one profiling algorithm being automatically generated based on processing of the source data, each of the more than one profiling algorithm defining a different way for characterizing data elements of the source data;

profiling the source data using the more than one profiling algorithm to generate profiling data, the profiling data representing the characterizations of the data elements;

identifying outlier data elements in the source data based on the profiling data;

removing the identified outlier data elements from the data elements of the source data; and mining the source data to generate mining data, the mining data identifying at least one relationship or correlation among the data elements of the source data;

generating a data dictionary including the identified data element types, the identified data element values, the profiling data, and the mining data;

generating a configuration file having the data dictionary; and generating and storing in the configuration file a data model logically organizing the data elements from the data dictionary in a common format.

20. The non-transitory computer-readable medium of claim 19, wherein machine learning is used to associate profiling algorithms with data element types, such that the automatic selection of the more than one profiling algorithm is updated using the machine learning.

\* \* \* \* \*